United States Patent
Thompson et al.

(10) Patent No.: US 7,134,793 B2
(45) Date of Patent: Nov. 14, 2006

(54) THRUST BEARING ASSEMBLY

(75) Inventors: Ronald J Thompson, Howell, MI (US); Sean Michael Welch, Clawson, MI (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 159 days.

(21) Appl. No.: 10/915,985

(22) Filed: Aug. 11, 2004

(65) Prior Publication Data
US 2006/0034556 A1 Feb. 16, 2006

(51) Int. Cl.
F16C 9/02 (2006.01)

(52) U.S. Cl. .................. 384/294; 384/123; 384/288

(58) Field of Classification Search ............. 384/275, 384/288, 294, 296
See application file for complete search history.

(56) References Cited

U.S. PATENT DOCUMENTS

| | | | |
|---|---|---|---|
| 5,072,707 A | 12/1991 | Takai et al. | |
| 5,192,136 A | 3/1993 | Thompson et al. | |
| 5,363,557 A | 11/1994 | Thompson et al. | |
| 5,520,466 A * | 5/1996 | Everitt et al. | 384/294 |
| 6,481,895 B1 * | 11/2002 | Yang et al. | 384/294 |
| 6,511,226 B1 | 1/2003 | Thompson et al. | |
| 6,921,210 B1 * | 7/2005 | Welch et al. | 384/294 |

FOREIGN PATENT DOCUMENTS

JP 06058319 A 3/1994

* cited by examiner

Primary Examiner—Thomas R. Hannon
(74) Attorney, Agent, or Firm—Robert L. Stearns; Dickinson Wright PLLC

(57) ABSTRACT

The subject invention provides a thrust bearing assembly having only three thrust flanges in total. One portion of the thrust bearing assembly comprises a main bearing having an arcuate bearing shell with a concave inner surface and a convex outer surface. A thrust washer having hydrodynamic features abuts one of the edges of the main bearing and extends radially outwardly from the outer surface thereof forming a thrust surface. The other of the edges of the main bearing is free of a flange. The free edge of the main bearing is preferably spaced inward from other thrust surfaces and the edge has a substantially narrower width than the other thrust surfaces. The other portion of the assembly may include a traditional thrust bearing having one thrust flange with hydrodynamic features and another thrust flange free of hydrodynamic features, both extending radially outwardly therefrom or may include another main bearing abutting a pair of thrust washers, one having hydrodynamic features and one free of hydrodynamic features, extending radially outwardly from the other main bearing. In either configuration, the thrust flange or thrust washer that is free of hydrodynamic features is opposite the thrust washer having hydrodynamic features of the main bearing.

40 Claims, 4 Drawing Sheets

THRUST BEARING ASSEMBLY

BACKGROUND OF THE INVENTION

1. Field of the Invention

The subject invention relates to a thrust bearing assembly as part of an engine assembly for use in a vehicle.

2. Description of the Related Art

Crankshafts are journaled in engine blocks by a series of axially spaced engine bearing assemblies. Each engine bearing assembly includes an upper portion seated in an arcuate recess of the block and an accompanying lower portion clamped tightly against the upper bearing half by a supportive bearing cap bolted to the engine block. At least one of the engine bearings in the set is designed to absorb axial thrust forces imported by the crankshaft during operation. The so-called thrust bearing differs from the other engine bearing in that it has two axially spaced thrust flanges that project radially outwardly. The thrust bearing presents opposite axially outwardly directed thrust faces which are seated on their backsides against the support surfaces of the block and engage associated thrust surfaces of the crankshaft, when necessary, to provide the thrust support. These thrust flanges typically have a uniform thickness and often are formed with oil grooves and contours to impart a hydrodynamic oil film action to the bearing.

During operation of the engine, loads on the crankshaft tend to force the crankshaft in axially opposite directions, accounting for the aforementioned thrust loads imparted to the thrust flanges of the thrust bearing. As the thrust loads are applied in one axial direction, it will be appreciated that the forward-most set of upper and lower thrust flanges will be confronted by the crankshaft thrust surface and will be seated tightly against the associated support surface of the block. It will be further appreciated that when a thrust force is applied by the crankshaft in the axially opposite direction that the opposite set of thrust flanges will be tightly seated against their associated support surfaces of the block. This constant force has the detrimental effect of stressing the thrust bearing of the base of the thrust flanges, which can lead to premature failure of the thrust bearing.

Most related art assemblies have hydrodynamic features on all thrust flanges or at least on three of the thrust flanges with two flanges having hydrodynamic features axially aligned. One such related art assembly is illustrated in FIGS. 6 and 7. FIG. 6 is a bottom perspective view of a thrust bearing assembly 100 having a thrust bearing 102 with one flange 104 having hydrodynamic features 106 and one flange 108 free of hydrodynamic features, a main bearing 110, and a thrust washer 112 having hydrodynamic features 114. The assembly 100 has an orientation device 116 that requires the assembly 100 to be positioned with the flanges having hydrodynamic features 104, 112 directly opposite one another such that the flanges 104, 112 are axially aligned. FIG. 7 is a cross-sectional view of the thrust bearing assembly 100 of FIG. 6. The two axially aligned flanges 104, 112 having hydrodynamic features absorb the major thrust forces of the engine. However, the axially spaced flange 108 free of hydrodynamic features is subjected to the minor thrust forces. These forces stress the other flange 108 which causes premature failure of the assembly 100.

The related art assemblies are characterized by one or more inadequacies as described above. It is an object of the present invention to reduce the cost of manufacturing the bearing assembly, while also absorbing the thrust forces generated by the engine.

BRIEF SUMMARY OF THE INVENTION AND ADVANTAGES

The subject invention provides a thrust bearing assembly that includes a thrust bearing having one thrust flange with hydrodynamic features and another thrust flange free of hydrodynamic features. Both flanges extend radially from an outer surface thereof forming thrust surfaces. The thrust bearing includes an arcuate bearing shell with a concave inner surface and a convex outer surface extending arcuately between first and second ends and extending axially between opposite edges. The assembly also has a main bearing including an arcuate bearing shell with a concave inner surface and a convex outer surface extending arcuately between first and second ends and extending between opposite edges. A thrust flange having hydrodynamic features abuts one of the edges of the main bearing and extends radially outwardly from the outer surface thereof forming a thrust surface. The thrust flange having hydrodynamic features of the main bearing is positioned opposite the flange free of hydrodynamic features of the thrust bearing. The main bearing has the other of the edges opposite the flange having hydrodynamic features of the thrust bearing free of a flange, such that the thrust bearing assembly has only three of the thrust flanges in total.

When installed in an engine assembly to journal a crankshaft, the thrust flange of the main bearing is opposite the thrust flange free of hydrodynamic features of the thrust bearing. These flanges are aligned in a single orientation such that there is one flange having hydrodynamic features in both directions to absorb the major and the minor thrust forces within the engine. The thrust flanges opposite the free edge of the main bearing has the hydrodynamic features and is positioned to absorb the lesser of the thrust forces, making a flange on the free edge unnecessary.

This invention has the advantage of reduced manufacturing costs as it relates to the engine assembly. Typically, the prior art engine assemblies relied on a thrust bearing as both the upper and the lower portions. The thrust bearings are more expensive to manufacture because once the material is cut, it must be formed by bending or roll forming the flanges. This extra time and labor increases the costs of manufacturing such an assembly. Therefore, the subject invention reduces the costs by replacing one of the thrust bearings with the main bearing and the thrust washer. The thrust washers are cut or punched out from the material and positioned adjacent the main bearing. There is no additional step of bending or roll forming the flanges required.

The invention has the further advantage of enabling the bearing assembly to be customized for the particular engine assembly. Typically, the engine assembly has a larger thrust force in one direction and a lesser thrust force in the other. Therefore, the subject invention absorbs both forces while also reducing the cost of the assembly.

THE DRAWINGS

These and other advantages of the present invention will be readily appreciated as the same becomes better understood by reference to the following detailed description and accompanying drawings wherein.

DETAILED DESCRIPTION

Figure 1:
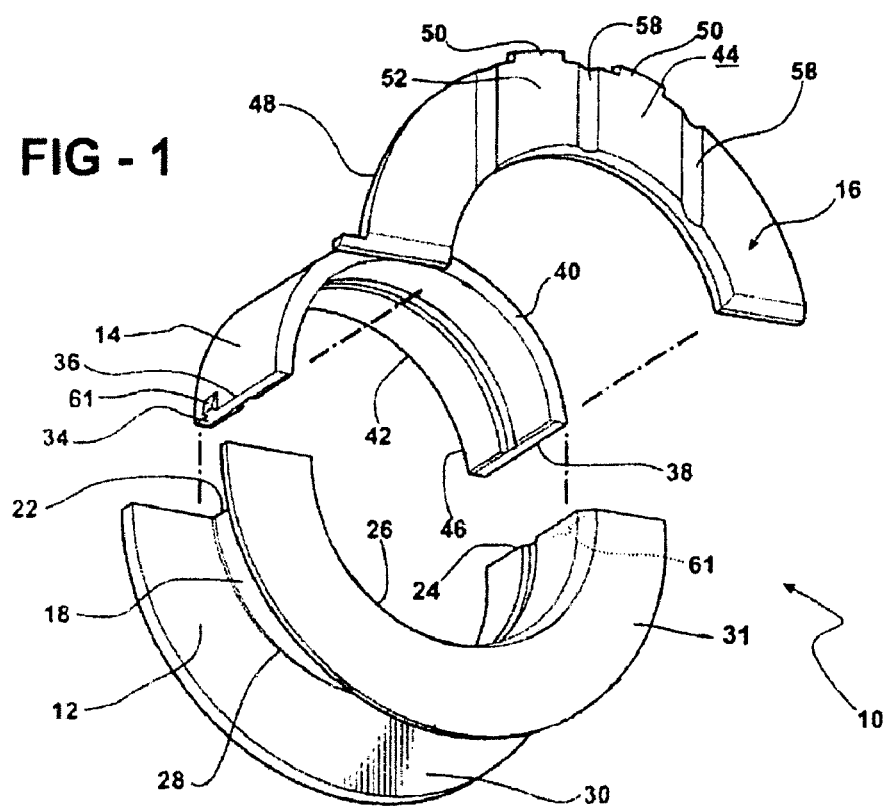
FIG. 1 is a bottom perspective view of one embodiment of a thrust bearing assembly having a thrust bearing, a main bearing, and a thrust washer.
Figure 2:
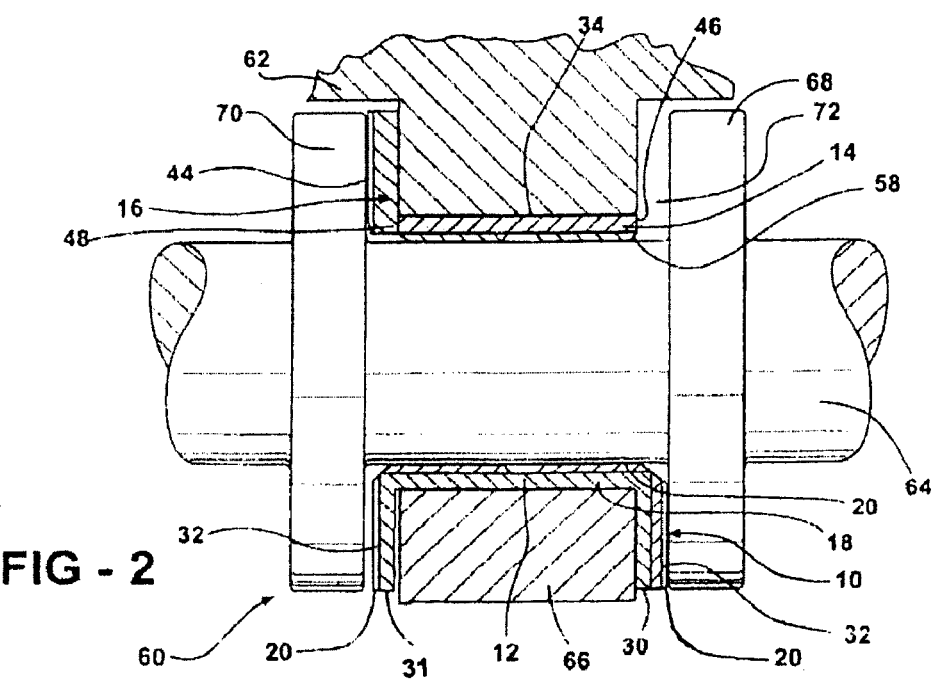
FIG. 2 is a cross-sectional view of the thrust bearing assembly of FIG. 1 shown mounted into an engine assembly.
Figure 3:
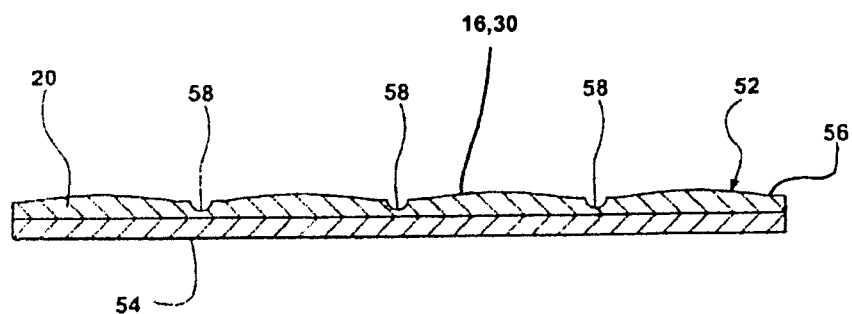
FIG. 3 is a cross-sectional view of one embodiment of the outer faces of the thrust bearing having contours thereon.

One embodiment of a thrust bearing assembly is shown generally at 10 in FIG. 1. A cross-sectional view of the thrust bearing assembly 10 is illustrated in FIG. 2. The embodiment illustrated in FIG. 1 includes a thrust bearing 12 shown as a lower portion and a main bearing 14 and a thrust flange 16 in abutting engagement thereof as an upper portion. It is to be appreciated that the upper and the lower portion may be reversed with the upper portion being the lower portion and vice versa.

The thrust bearing 12 includes an arcuate bearing shell 18 with a concave inner surface and a convex outer surface. The inner surface may include a bearing material 20 as will be described below. The shell 18 extends arcuately between first and second ends 22, 24 and extends axially between opposite edges 26, 28 thereof. The thrust bearing 12 has thrust flanges 30, 31 extending radially outwardly from the outer surface thereof forming thrust surfaces 32. One thrust flange 30 has hydrodynamic features and one thrust flange 31 is free of hydrodynamic features, such that the flange 30 having hydrodynamic features is thicker than the flange free of hydrodynamic features. Examples of the thrust bearing 12 are disclosed in, but not limited to, U.S. Pat. Nos. 5,363,557 and 5,192,136, assigned to assignee of the subject invention and which are incorporated herein by reference.

The main bearing 14 also includes an arcuate bearing shell 34 with a concave inner surface and a convex outer surface. The inner surface of the main bearing 14 may also include the bearing material 20. The shell 34 extends arcuately between first and second ends 36, 38 and extends between opposite edges 40, 42 thereof. The assembly also includes the thrust flange 16 having hydrodynamic features abutting one of the edges of the main bearing 14 and extending radially outwardly from the outer surface thereof forming a thrust surface 44. The thrust flange 16 of the main bearing 14 is positioned opposite the flange 31 of the thrust bearing 12 that is free of hydrodynamic features. The other of the edges 46 of the main bearing 14 opposite the flange 30 of the thrust bearing 12 having hydrodynamic features is free of a flange. In this manner, the thrust bearing assembly 10 has only three of the thrust flanges in total and the flanges having hydrodynamic features are axially spaced and radially opposite from each other. The free edge 46 of the main bearing 14 is preferably spaced inward from the opposite thrust surface 32 of the thrust bearing 12. Since the free edge 46 does not have a flange, the distance between the edge 46 and the thrust surface 44 is substantially narrower in width than the distance between the thrust surfaces 32, 44. More preferably, the edge does not act a thrust surface. Those skilled in the art recognize that the flange free of hydrodynamic features is thinner than the flanges having hydrodynamic features. The flanges 30, 16 having hydrodynamic features may be the same thickness or different, so long as they are thicker than the flange free of hydrodynamic features.

Preferably, the thrust flange 16 of the main bearing 14 is a thrust washer 48 formed as a separate structure from that of the main bearing 14. One example of the thrust washer 48 is disclosed in, but not limited to, U.S. Pat. No. 6,511,226 assigned to the assignee of the subject invention and which is incorporated herein by reference. One primary advantage of forming the assembly 10 from the thrust bearing 12, the main bearing 14, and the thrust washer 48 is a reduction in manufacturing cost. Typically, manufacturers utilize two thrust bearings 12 in combination as the upper and lower portions to form the bearing assembly 10. The cost to manufacture the thrust bearing 12 is more than the cost to manufacture the main bearing 14 and the thrust washer 48 separately. Therefore, utilizing the combination of the three components reduces the cost. Another advantage is that the assembly according to the subject invention can be quickly customized for various engines as will be described more fully below.

Figure 4:
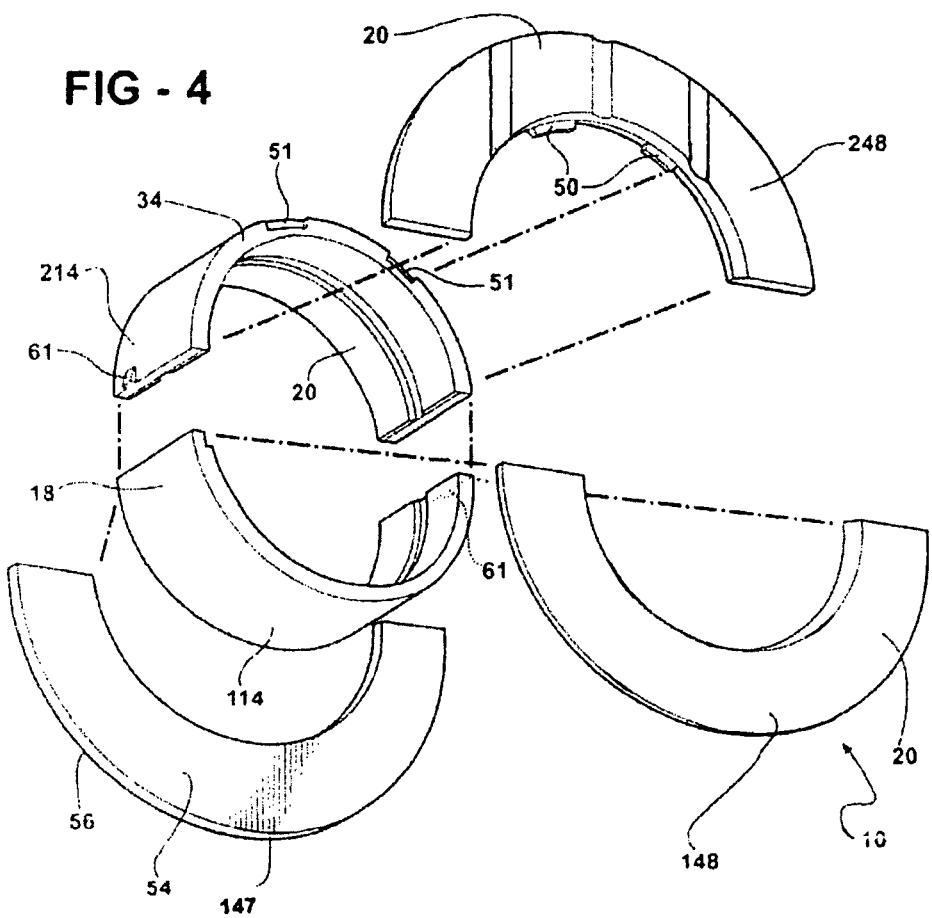
FIG. 4 is a bottom perspective view of another embodiment of a thrust bearing assembly having a first main bearing, a pair of first thrust washers, a second main bearing, and a second thrust washer.

When formed as separate pieces, as illustrated in FIGS. 1 and 2, the subject invention includes interlocks between the main bearing 14 and the thrust washer 48 for holding the thrust washer 48 relative to the main bearing 14 and preventing rotation thereof. It should be appreciated by those skilled in this art that when the thrust bearing 12 is formed as one piece, one of the thrust flanges 31 contacts the thrust washer 48 and prevents rotation, so the interlocks may not be necessary. The interlocks are illustrated as tabs 50 extending from the thrust washer 48 for engaging recesses 51. The recesses 51 are illustrated in FIG. 4 in the bearing shell 34. However, the recesses 51 may also be formed in the engine block as would receive the thrust bearing 12 shown in FIG. 1. Those skilled in the art will recognize additional ways of forming the interlocks to prevent rotation thereof.

Figure 6:
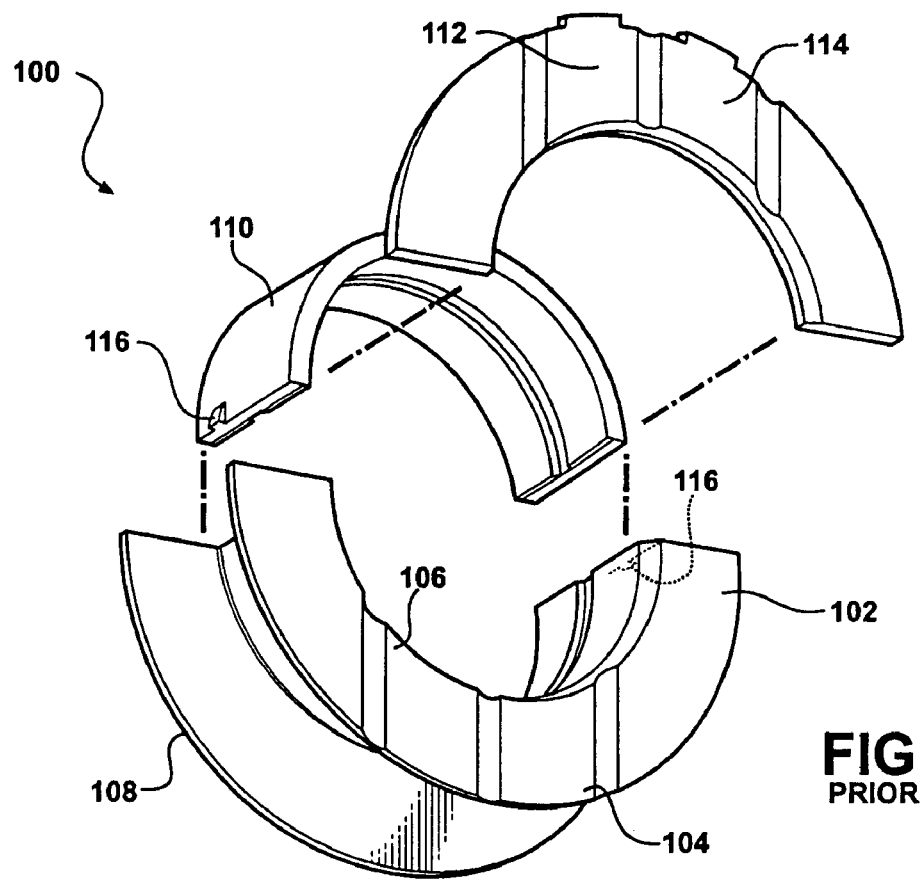
FIG. 6 is a bottom perspective view of a prior art thrust bearing assembly having a thrust bearing with one flange having hydrodynamic features and one flange free of hydrodynamic features, a main bearing, and a thrust washer having hydrodynamic features.
Figure 7:
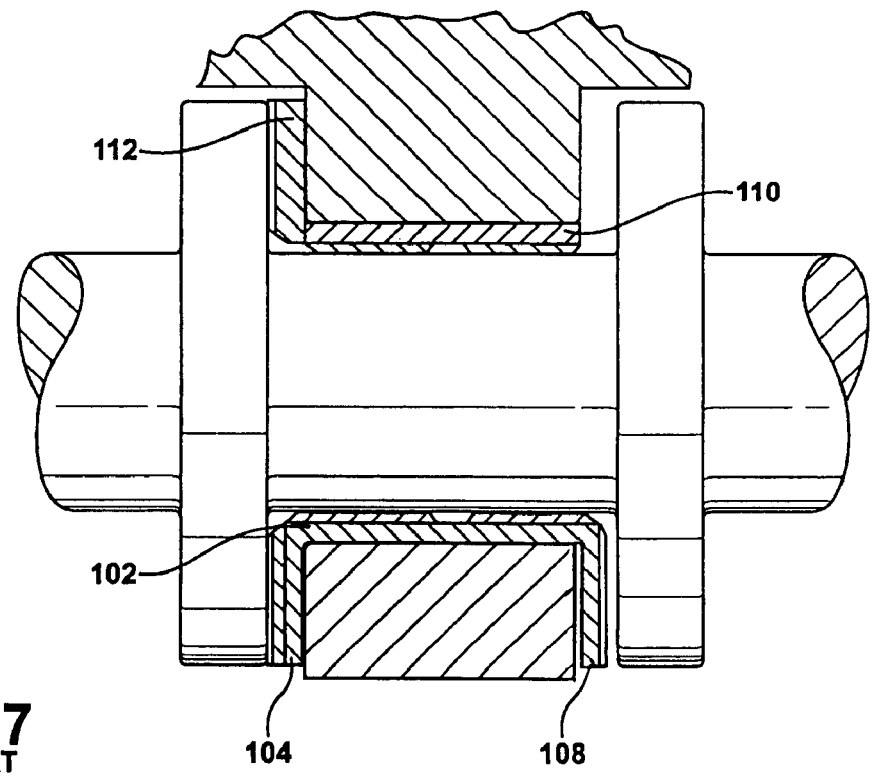
FIG. 7 is a cross-sectional view of the prior art thrust bearing assembly of FIG. 6.

The assembly further comprises an orientation device generally shown at 61. The orientation device 61 positions the thrust bearing 12, the main bearing 14, and the thrust flange 16 in a single orientation such that the flanges with hydrodynamic features are axially spaced from each other. The orientation device 61 is illustrated as a tab extending from the thrust bearing 12 and the main bearing 14. The tabs are received in the engine block and prevent rotation thereof. The prior art FIGS. 6 and 7 illustrates the assembly having the orientation device 116 that positions the flanges having hydrodynamic features in the same plane and axially aligned. Since the orientation device 116 is machined into the engine block, the prior art bearings can only be positioned in a single orientation and cannot be reversed to axially space the flanges having hydrodynamic features.

Alternatively, the main bearing 14 and the thrust flange 16 of the main bearing 14 may be formed as one piece. The bearing shell 34 of the main bearing 14 and the flanges would then be formed of the same material. The material is formed and cut into desired lengths. Then the material is bent to form the flange, and may then be bent in arcs. In a similar manner, the thrust bearing 12 and the flanges 30, 31 of the thrust bearing 12 may be formed as one piece, or part, with the bearing shell 18 of the thrust bearing 12 from a same material, as illustrated in FIGS. 1 and 2. The material is formed and cut into desired lengths. Then the material is bent to form the flanges, and may then be bent in arcs.

Referring to the thrust flanges 16, 30 generally, which includes the thrust washers 48, each of the flanges 16, 30 has an inner face 54 and an outer face 56. The outer face 56 may be contoured as is known in the art for those flanges that have hydrodynamic features. Preferably, each of the outer face 56 of each flange 16, 30 is formed with a series of oil grooves 58. The oil grooves 58 channel a lubricant (not shown) to and from the contoured outer face 56 to develop a protective hydrodynamic oil film across the contoured face during operation to reduce friction and wear. The oil grooves 58 may be parallel or transverse to each other.

The bearing material 20 may also be disposed on the surfaces of the assembly, which includes the thrust surfaces 32, 44 of the flanges 16, 31 and the inner surfaces of the shells 18, 34. The bearing material 20 may be ramped to form the contours on the outer face 56, as discussed above. The bearing material 20 is relatively softer than the underlying base metal of the bearing shells 18, 34 and flanges 16, 31, which are typically made of steel. Those copper or aluminum-based bearing materials typically used in thrust bearing applications may be used in the present invention. The invention contemplates other bearing materials as well, such as, but not limited to, polymer-based material. The bearing material 20 may be added to the material before bending the flanges, or after the flanges are bent.

The flanges may also be formed free of backing material, shown in FIGS. 1, 2, 4, and 5, as taught in U.S. Pat. No. 6,511,226. As discussed therein, the flanges are formed from a matrix of multiple components that act as both the backing material and the bearing material 20. However, the flanges may be formed of either the single layer or the backing layer plus the bearing material 20 without deviating from the scope of the subject invention.

Figure 5:
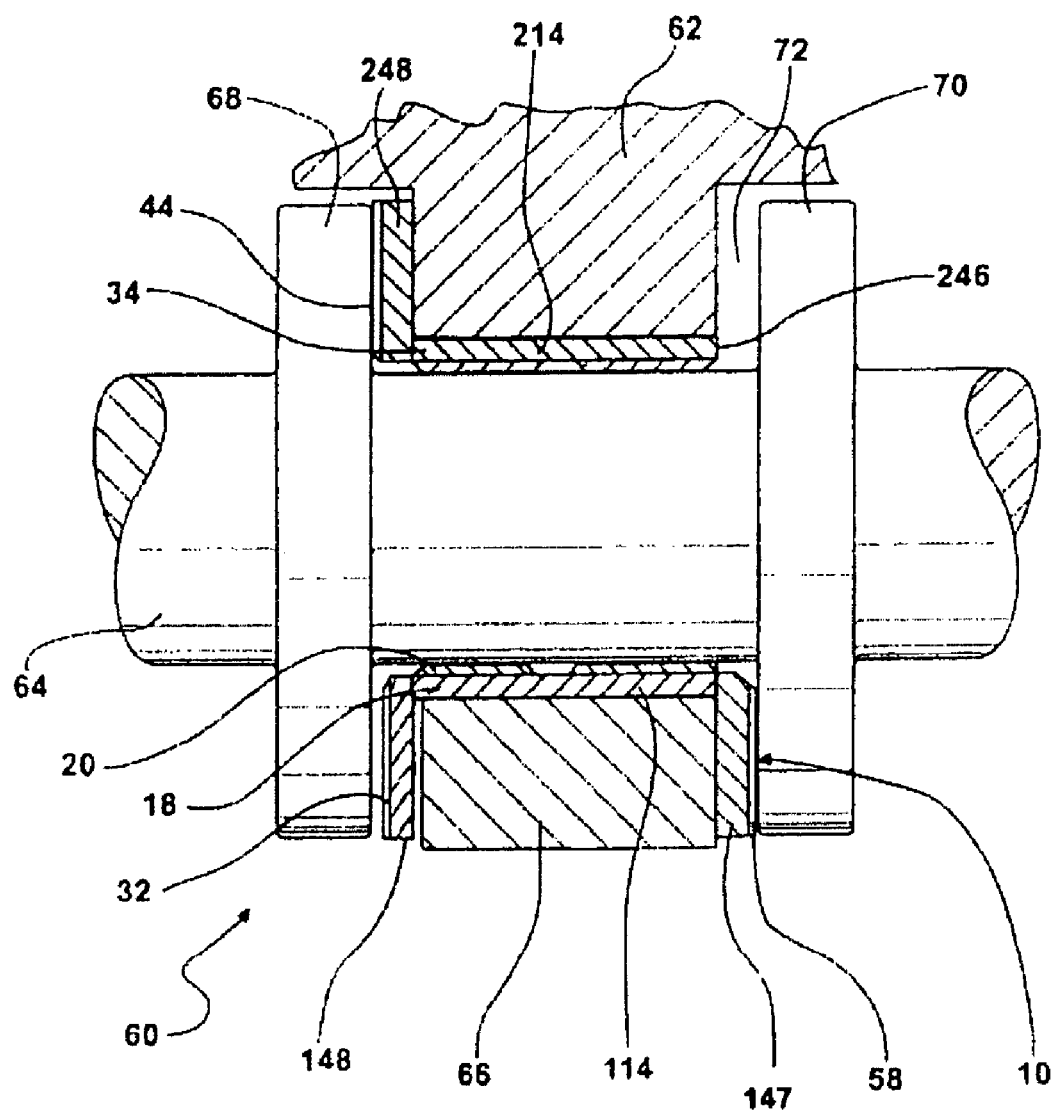
FIG. 5 is a cross-sectional view of the thrust bearing assembly of FIG. 4 shown mounted into an engine assembly.

Referring to FIGS. 4 and 5, an alternate embodiment of the bearing assembly 10 is illustrated. In this alternate embodiment, the lower portion includes a first main bearing 114 and a pair of first thrust washers 147, 148 abutting the edges of the first main bearing 114. Again, one of the first thrust washers 147 has hydrodynaniic features and one is free of hydrodynamic features. The upper portion includes a second main bearing 214 and a second thrust washer 248 having hydrodynamic features abutting one of the edges of the second main bearing 214. The first main bearing 114 and the second main bearing 214 are substantially identical to the main bearing 14 described above. Likewise, the first and the second thrust washers 147, 248 are substantially identical to the thrust washer 48 described above. This alternate embodiment provides further cost savings during the manufacturing process. The lower portion, even with the two thrust washers 147, 148, is less expensive to manufacture than the thrust bearing 12. One primary reason for the cost savings is that the thrust washers 147, 148 can be machined very quickly. Whereas, the thrust bearings 12 are cut out and then rolled formed to have the integral flanges. Therefore, the cost savings results from reduced labor and time required to manufacture the assembly.

In this embodiment, the second thrust washer 248 is positioned opposite the first thrust washer 148 of the first main bearing 114 free of hydrodynamic features. The other of the edges of the second main bearing 214 opposite the first thrust washer 147 having hydrodynamic features is free of a thrust washer such that the thrust bearing assembly 10 has only three of the thrust surfaces 32, 44 in total and the two flanges 147, 148 having hydrodynamic features are axially spaced from one another. The free edge 246 is spaced inward from the opposite thrust surface 32 and has a substantially narrower width than the thrust surfaces 32, 44.

Each of the first and the second thrust washers 148, 248 may be separate from the first and the second main bearings 114, 214, respectively. The interlocks may be located therebetween to hold the thrust washers 147, 148, 248 relative to the main bearings 114, 214 and prevent rotation thereof. Alternatively, the main bearings 114, 214 and the thrust washers 147, 148, 248 may be formed as one piece.

Referring generally to FIGS. 2 and 5, an engine assembly 60 for use in a vehicle (not shown) is shown generally at 60. In FIG. 2, the engine assembly 60 has the embodiment of the thrust bearing assembly 10 shown in FIG. 1 incorporated therein. FIG. 5 illustrates the engine assembly 60 having the embodiment of the thrust bearing assembly 10 shown in FIG. 4 incorporated therein. Generally, the engine assembly 60 includes an upper support surface 62, a shaft 64 received within the upper support surface 62, and a lower support surface 66. The upper support surface 62 is preferably an engine block and the lower support surface 66 is preferably a bearing cap. The shaft 64 is preferably a crankshaft.

In the preferred embodiment, the shaft 64 is the crankshaft having forward and rearward thrust surfaces 68, 70, next adjacent the bearing assembly 10. The terms "forward" and "rearward" are used to denote opposite ends or direction of the crankshaft 64 in relation to the front and back of the engine, which may be arranged front to back in the vehicle, or transverse, as the case may be. The forward thrust surface 68 is closer to the front of the engine assembly 60 and the rearward thrust surface 70 is closer to the rear of the engine assembly 60. The thrust bearing assembly 10 rotatably supports the shaft 64.

When arranged using the thrust bearing assembly 10 illustrated in FIG. 1, the ends 22, 24 of the thrust bearing 12 are positioned substantially in mating contact with the ends 36, 38 of the main bearing 14. In the preferred embodiment, the assembly defines a gap 72 between the edge 46 free of the flange of the main bearing 14 and the forward thrust surface 68. The flange 16 of the main bearing 14 preferably engages the rearward thrust surface 70 of the shaft 64 and the edge 46 free of flanges is preferably adjacent the forward thrust surface 68 of the shaft 64. Alternately, the bearings may be reversed, such that the flange 16 of the main bearing 14 contacts the forward thrust surface 68 and the edge 46 free of flanges is near the rearward thrust surface 70. Referring back to FIG. 2, the free edge 46 of the main bearing 14 is in a different plane than the thrust surfaces 32 of the flange 30 of the thrust bearing 12 opposite thereof. Because the thrust surface 32 is in a different plane, when a force is exerted in one of the directions, the thrust surface 32 absorbs the force.

It is to be appreciated that the embodiment illustrated in FIG. 5 is substantially identical to the operation of the embodiment illustrated in FIG. 2. However, in FIG. 5, the second thrust washer 248 is illustrated as contacting the forward thrust surface 68, instead of the rearward thrust surface 70 as in FIG. 2. The structural differences have been discussed above and do not impact the operation of the assembly. Accordingly, the specific description of the operation of the embodiment illustrated in FIG. 5 is that same as for the embodiment illustrated in FIG. 2 and is not repeated.

Obviously, many modifications and variations of the present invention are possible in light of the above teachings. The invention may be practiced otherwise than as specifically described within the scope of the appended claims.

What is claimed is:

1. A thrust bearing assembly comprising:
   a thrust bearing including an arcuate bearing shell with a concave inner surface and a convex outer surface extending arcuately between first and second ends and extending axially between opposite edges and having thrust flanges extending radially from said outer surface thereof forming thrust surfaces and one of said thrust flanges having hydrodynamic features and said other thrust flange being free of hydrodynamic features;

a main bearing including an arcuate bearing shell with a concave inner surface and a convex outer surface extending arcuately between first and second ends and extending between opposite edges;

a thrust flange having hydrodynamic features thereon abutting one of said edges of said main bearing and extending radially outwardly from said outer surface thereof forming a thrust surface and positioned opposite said flange of said thrust bearing free of hydrodynamic features; and wherein the other of said edges of said main bearing opposite said flange of said thrust bearing having hydrodynamic features is free of a flange, such that said thrust bearing assembly has only three of said thrust flanges in total.

2. A thrust bearing assembly as set forth in claim 1 further comprising an orientation device positioning said thrust bearing, said main bearing, and said thrust flange in a single orientation such that said flanges with hydrodynamic features are axially spaced from each other.

3. A thrust bearing assembly as set forth in claim 2 wherein said orientation device is further defined as locating lips extending from said thrust bearing and said main bearing.

4. A thrust bearing assembly as set forth in claim 3 wherein said orientation device is further defined as a tab extending from said thrust flange of said main bearing.

5. A thrust bearing assembly as set forth in claim 1 wherein said edge free of a flange is spaced axially inward from said thrust surface of said thrust bearing having hydrodynamic features.

6. A thrust bearing assembly as set forth in claim 1 wherein said free edge and said thrust surface on said thrust flange has a substantially narrower width than defined between said thrust surfaces on said thrust bearing.

7. A thrust bearing assembly as set forth in claim 1 wherein said thrust flange of said main bearing is further defined as a thrust washer formed as a separate structure from that of said main bearing.

8. A thrust bearing assembly as set forth in claim 7 further comprising interlocks between said main bearing and said thrust washer for holding said thrust washer relative to said main bearing and preventing rotation thereof.

9. A thrust bearing assembly as set forth in claim 8 wherein said thrust flanges include oil grooves formed thereon.

10. A thrust bearing assembly as set forth in claim 1 wherein said main bearing and said thrust flange of said main bearing are formed as one piece.

11. A thrust bearing assembly as set forth in claim 1 wherein said thrust bearing and said flanges are formed as one piece.

12. A thrust bearing assembly as set forth in claim 1 further comprising a bearing material disposed on said inner surface of said thrust bearing.

13. A thrust bearing assembly as set forth in claim 1 further comprising a bearing material disposed on said inner surface of said main bearing.

14. A thrust bearing assembly comprising:
a first main bearing including an arcuate bearing shell with a concave inner surface and a convex outer surface extending arcuately between first and second ends and extending between opposite edges;

a pair of first thrust washers abutting said edges of said first main bearing and extending radially outwardly from said outer surface thereof forming thrust surfaces;

wherein one of said first thrust washers has hydrodynamic features and the other of said first thrust washers is free of hydrodynamic features;

a second main bearing including an arcuate bearing shell with a concave inner surface and a convex outer surface extending arcuately between first and second ends and extending between opposite edges;

a second thrust washer having hydrodynamic features and abutting one of said edges of said second main bearing and extending radially outwardly from said outer surface thereof forming a thrust surface and positioned opposite said first thrust washer of said first main bearing free of hydrodynamic features; and wherein the other of said edges of said second main bearing opposite said first thrust washer having hydrodynamic features is free of a thrust washer such that said thrust bearing assembly has only three of said thrust surfaces in total.

15. A thrust bearing assembly as set forth in claim 14 further comprising an orientation device positioning said first and said second main bearings and said pair of first thrust washers and said second thrust washer in a single orientation such that said washers with hydrodynamic features are axially spaced from each other.

16. A thrust bearing assembly as set forth in claim 15 wherein said orientation device is further defined as locating lips extending from first and said second main bearings.

17. A thrust bearing assembly as set forth in claim 16 wherein said orientation device is further defined as tabs extending from said pair of first thrust washers and said second thrust washer.

18. A thrust bearing assembly as set forth in claim 14 wherein said free edge is spaced inward from the opposite thrust surface of said thrust bearing.

19. A thrust bearing assembly as set forth in claim 14 wherein said free edge and said thrust surface on said second thrust washer has a substantially narrower width than defined between said thrust surfaces on said first thrust washers.

20. A thrust bearing assembly as set forth in claim 14 wherein said second thrust washer and said second main bearing are separate from one another.

21. A thrust bearing assembly as set forth in claim 20 further comprising interlocks between said second main bearing and said second thrust washer for holding said second thrust washer relative to said second main bearing and preventing rotation thereof.

22. A thrust bearing assembly as set forth in claim 14 wherein said second main bearing and said second thrust washer are formed as one piece.

23. A thrust bearing assembly as set forth in claim 14 wherein said pair of first thrust washers and said first main bearing are separate from one another.

24. A thrust bearing assembly as set forth in claim 23 further comprising interlocks between said first main bearing and said pair of first thrust washers for holding said first thrust washers relative to said first main bearing and preventing rotation thereof.

25. A thrust bearing assembly as set forth in claim 14 wherein each of said thrust washers include oil grooves formed thereon.

26. A thrust bearing assembly as set forth in claim 14 further comprising a bearing material disposed on said inner surface of said main bearings.

27. An engine assembly for use in a vehicle, said assembly comprising:
an upper support surface and a lower support surface;
a shaft received within said upper support surface;
a thrust bearing assembly rotatably supporting said shaft between said upper support surface and said lower support surface comprising;
a thrust bearing including an arcuate bearing shell with a concave inner surface and a convex outer surface extending arcuately between first and second ends and extending axially between opposite edges and having one thrust flange with hydrodynamic features and another thrust flange free of hydrodynamic features, both extending radially from said outer surface thereof forming thrust surfaces;
a main bearing including an arcuate bearing shell with a concave inner surface and a convex outer surface extending arcuately between first and second ends and extending between opposite edges;
a thrust flange having hydrodynamic features abutting one of said edges of said main bearing and extending radially outwardly from said outer surface thereof and positioned opposite said thrust flange of said thrust bearing free of hydrodynamic features such that said thrust flange forms a thrust surface; and
wherein the other of said edges of said main bearing opposite said flange of said thrust bearing having hydrodynamic features is free of a flange, such that said thrust bearing assembly has only three of said thrust flanges in total.

28. An engine assembly as set forth in claim 27 wherein said edge free of a flange is spaced axially inward from said thrust surface of said thrust bearing having hydrodynamic features.

29. An engine assembly as set forth in claim 27 wherein said free edge and said thrust surface on said thrust flange has a substantially narrower width than defined between said thrust surface on said thrust bearing.

30. An engine assembly as set forth in claim 27 wherein said thrust flange of said main bearing is further defined as a thrust washer formed as a separate structure from that of said main bearing.

31. An engine assembly as set forth in claim 30 wherein said thrust washer and said main bearing are separate from one another.

32. An engine assembly as set forth in claim 30 further comprising interlocks between said main bearing and said thrust washer for holding said thrust washer relative to said main bearing and preventing rotation thereof.

33. An engine assembly as set forth in claim 30 wherein said main bearing and said thrust washer are formed as one piece.

34. An engine assembly as set forth in claim 27 wherein said thrust bearing and said flanges are formed as one piece.

35. An engine assembly as set forth in claim 27 wherein said upper support surface is further defined as an engine block.

36. An engine assembly as set forth in claim 27 wherein said lower support surface is further defined as a bearing cap.

37. An engine assembly as set forth in claim 27 wherein said shaft is further defined as a crankshaft.

38. An engine assembly as set forth in claim 27 wherein said thrust bearing assembly further comprises an orientation device positioning said thrust bearing, said main bearing, and said thrust flange in a single orientation such that said flanges with hydrodynamic features are axially spaced from each other.

39. An engine assembly as set forth in claim 38 wherein said orientation device is further defined as locating lips extending from said thrust bearing and said main bearing.

40. An engine assembly as set forth in claim 39 wherein said orientation device is further defined as a tab extending from said thrust flange of said main bearing.

* * * * *

UNITED STATES PATENT AND TRADEMARK OFFICE
CERTIFICATE OF CORRECTION

PATENT NO.       : 7,134,793 B2
APPLICATION NO.  : 10/915985
DATED            : November 14, 2006
INVENTOR(S)      : Ronald J. Thompson et al.

It is certified that error appears in the above-identified patent and that said Letters Patent is hereby corrected as shown below:

Abstract, line 10: "from other thrust surfaces" should read --from the other thrust surfaces--.

Column 5, line 37: "hydrodynaniic features" should read --hydrodynamic features--.

Column 5, line 45: "thrust washer 48" should read --thrust washer 148--.

Column 5, line 62: "two flanges 147, 148" should read --two flanges 147, 248--.--.

Column 5, line 66: "second thrust washers 148, 248" should read --second thrust washers 147, 148, 248--.

Column 8, line 32: "lips extending from first" should read --lips extending from said first--.

Signed and Sealed this

First Day of May, 2007

JON W. DUDAS
*Director of the United States Patent and Trademark Office*